Sept. 17, 1957   I. D. SHAPIRO   2,806,980
AUTOMATIC CIRCUIT CONTROL FOR AUTOMOTIVE VEHICLE
Filed June 6, 1955

INVENTOR.
IRVING D. SHAPIRO
BY Arthur H. Seidel
ATTORNEY

United States Patent Office 2,806,980
Patented Sept. 17, 1957

2,806,980
AUTOMATIC CIRCUIT CONTROL FOR AUTOMOTIVE VEHICLE

Irving D. Shapiro, Brooklyn, N. Y.

Application June 6, 1955, Serial No. 513,357

3 Claims. (Cl. 315—83)

This invention relates to an automatic circuit control or cut-off for automotive vehicles, and more particularly to a mechanism for selectively breaking the electrical circuit of an automotive vehicle after a predetermined interval, when the generator of such vehicle is not in operation, so as to prevent current drainage of the vehicle's battery.

It is a not infrequent occurrence that the driver of an automotive vehicle parks such vehicle at night and neglects to shut off its headlights, or other electrical equipment that is not shut off when the ignition key is removed. This inaction by the driver leads to a constant drain on the vehicle's battery, and may lead to the discharge of such battery or the drainage of current therefrom to a level below that necessary to start the vehicle.

It is not practical to shut off all of the electrical equipment of a vehicle when the ignition key is removed. Thus, the driver may desire to have his headlights or parking lights remain lit, even though his vehicle is parked. It is for this reason that separate light switches are provided on all commercial vehicles which are independent of the ignition switch.

This invention has as an object the provision of an automatic circuit controller or cut-off for vehicular electrical equipment, which is independent of the ignition switch, but which cut-off has means for permitting operation of such equipment if the driver wishes to operate such equipment independently of such controller or cut-off.

Another object of the present invention is the provision of an automatic circuit controller or cut-off which will extinguish the headlights of an automotive vehicle after the lapse of a predetermined time interval from the parking of such vehicle.

A further object of the present invention is the provision of means for preventing inordinate current drainage and discharge of the storage battery of an automotive vehicle.

A still further object is the provision of a bimetal cut-off switch which once thrown to circuit breaking position will remain there until manually reset.

Other objects will appear hereafter.

For the purpose of illustrating the invention there is shown in the drawings a form which is presently preferred; it being understood, however, that this invention is not limited to the precise arrangements and instrumentalities shown.

Referring to the drawings wherein like reference characters refer to like parts:

Figure 1:
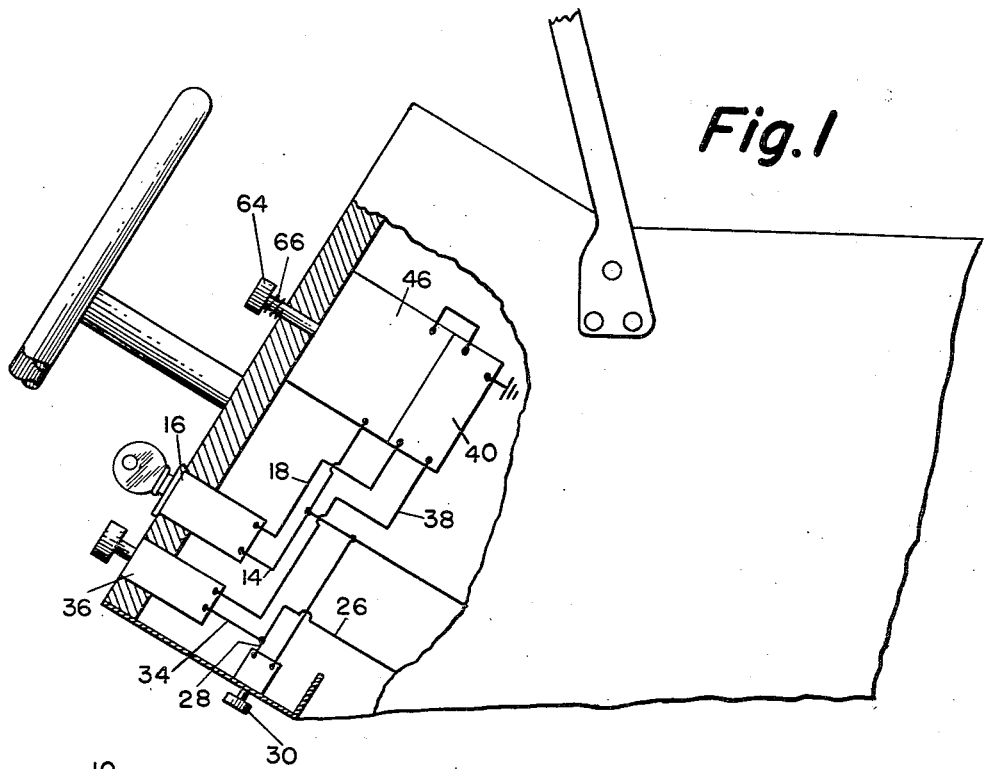
Figure 1 is a section through the dashboard portion of an automotive vehicle equipped with an embodiment of the present invention.

Referring to the drawings, 10 designates the vehicle's battery, which may be of conventional design, and which is grounded at one terminal by line 12. The other terminal of battery 10 is connected by line 14 to one post of ignition switch 16. Ingition switch 16 may be a conventional key-operated switch commonly used on automotive vehicles, such as passenger cars and trucks. Line 18 connects ignition switch 16 to the electrical equipment in the circuit designated by the resistor 20. Such electrical equipment 20 may include the radio, window-raisers, starter, and other electrical equipment rendered operative when the ignition switch 16 is closed. The electrical equipment 20 is grounded by line 22.

The vehicle's headlights diagramatically designated at 24 may be operated independently of the ignition switch 16. Headlights 24 are connected to line 14 by line 26, line 28, defeat switch 30, and line 32.

The headlights 24 are also connected by line 34, standard light switch 36 and line 38 to a relay designated generally as 40. One post 41 of relay 40 is connected to line 42, which in turn is connected with line 18, a line 44 being provided from line 42 to the coil of relay 40. The other post 45 of relay 40 is connected to the timer cut-off mechanism of the subject invention designated generally as 46.

The timer cut-off mechanism 46 is connected by line 48 to post 45 of relay 40. Timer cut-off mechanism 46 includes a bimetallic arm 50 connected to line 48. Bimetallic arm 50 constitutes a thermal switch component and has a switch post 52 connected by line 54 to heater coil 56, which is connected to a post of ignition switch 16 by line 58. The timer cut-off mechanism 46 also includes a detent or pawl 60 which is spring-urged downwardly by means of spring 62. In addition, the timer cut-off mechanism is provided with a release switch or reset switch 64 which is spring-urged away from pawl 60 by spring 66, but which may be urged rectilinearly against the action of spring 66 to move pawl 60 in a direction opposite to that which pawl 60 is urged by spring 62.

The operation of the device of the present invention is as follows:

When the ignition switch 16 is closed, all of the vehicle's electrical equipment may be operated at will. Thus, the driver may utilize the vehicle's electrical equipment 20, or he may close standard light switch 36 and use his headlights 24. If the driver closes switch 36 and uses his headlights 24, the relay 40 is connected with post 41, and the lights 24 operate in the identical fashion as the remaining electrical equipment 20 of the vehicle. Thus, current flows through line 42, line 38, switch 36, line 34, and line 26 to headlights 24.

Figure 2:
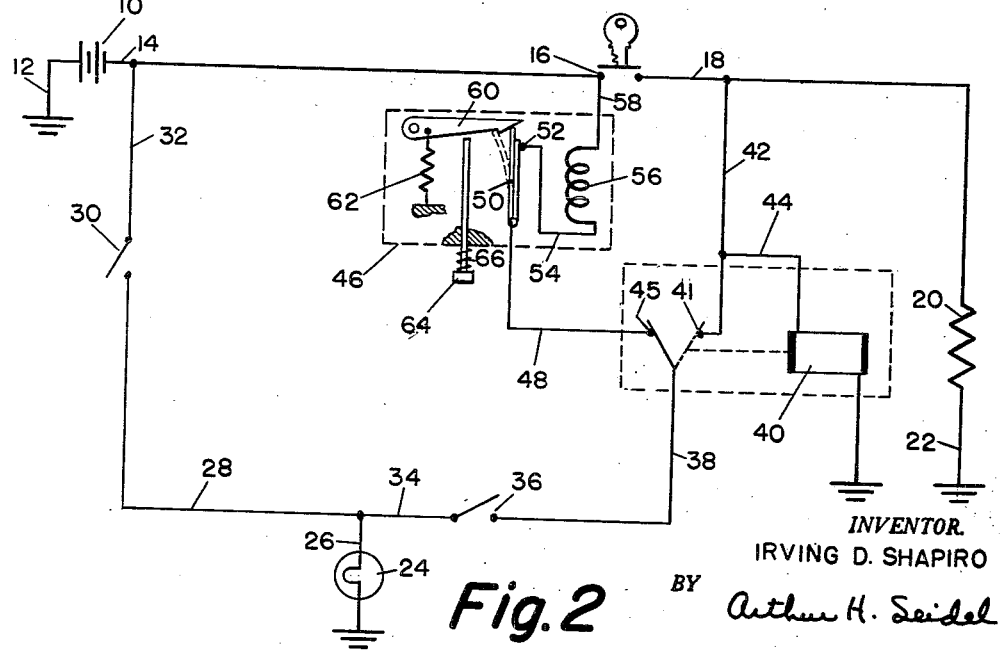
Figure 2 is a schematic presentation of the embodiment of the present invention shown in Figure 1.

When the vehicle's ignition is turned off, but the driver neglects through an oversight to open switch 36, the plunger of relay 40 is switched to post 45, and the lights 24 remain lit, as current will flow through coil 56, line 54, bimetallic arm 50, line 48, line 38, switch 36, line 34, and line 26 to headlights 24. This flow of current through coil 56 causes coil 56 to heat up. After a predetermined time interval, as for example ten or so minutes, coil 56 is hot enough to urge bimetallic arm 50 away from post 52. The upper edge of bimetallic arm 50 is cammed on pawl 60 and raises pawl 60 against the action of spring 62. When the upper edge of bimetallic arm 50 passes the hook portion of pawl 60, it is caught thereon and is prevented from returning to post 52. The removal of bimetallic arm 50 from post 52 stops the flow of current through line 58, coil 56, line 54 and line 48, and therefor stops the flow of current to headlights 24. Bimetallic arm 50 is retained in the cut-off position shown in dotted line in Figure 2 until the reset switch 64 is spring-urged against spring 66 and engages pawl 60, urging it in the opposite direction from the action of spring 62, thereby releasing bimetallic arm 50. Thus, the driver of the vehicle, on returning to his car can release the cut-off mechanism by pushing reset switch 64, overcoming the action of spring 66, If the driver wishes to maintain his headlights 24 lit after opening switch 16, this may be accomplished by the use of defeat switch 30. Thus, the closing of defeat switch 30 maintains headlights 24 lit, notwithstanding the action of bimetallic arm 50.

The present invention may be embodied in other specific forms without departing from the spirit or essential attributes thereof and, accordingly, reference should be made to the appended claims, rather than to the foregoing specification as indicating the scope of the invention.

I claim:

1. An automatic current cut-off circuit for the headlights of an automotive vehicle comprising an electric light, a current source, a first circuit connecting said light and said current source, a switch in said circuit, a second circuit connecting said light and said current source, a light switch in said second circuit, said second circuit comprising a pair of alternate circuits intermediate said current source and said light switch, a relay for operatively selecting one of said alternate circuits, a switch controlling the action of said relay, and means in one of said alternate circuits for breaking said second circuit, said means comprising a bimetallic element, a heating coil, and means for retaining said bimetallic element disposed in the position to which it is urged upon the heating of the heating coil, and manually operated means for releasing said bimetallic element from such position.

2. An automatic current cut-off circuit for the headlights of an automotive vehicle comprising an electric light, a current source, a first circuit connecting said light and said current source, a switch in said circuit, a second circuit connecting said light and said current source, a light switch in said second circuit, said second circuit comprising a pair of alternate circuits intermediate said current source and said light switch, a relay for operatively selecting one of said alternate circuits, a switch controlling the action of said relay, and means in one of said alternate circuits for breaking said second circuit automatically, and manually operated means for defeating said last-mentioned means.

3. An automatic current cut-off circuit for the headlights of an automotive vehicle comprising an electric light, a current source, a first circuit connecting said light and said current source, a switch in said circuit, a second circuit connecting said light and said current source, a light switch in said second circuit, said second circuit comprising a pair of alternate circuits intermediate said current source and said light switch, a relay for operatively selecting one of said alternate circuits, a switch controlling the action of said relay, and means in one of said alternate circuits for breaking said second circuit, said means comprising a heating coil, a bimetallic element in series with said heating coil and operatively disposed in relationship thereto whereby heating of said heating coil to a predetermined temperature causes said bimetallic element to withdraw from its position in series with said heating coil and to break said second circuit, a detent for retaining said bimetallic element in its withdrawn position, spring means urging said detent to a disposition such that said detent retains said bimetallic element in a withdrawn position with said circuit broken, and manually operated release means for engaging said detent and urging it in a direction opposed to that urged by said spring means, whereby the bimetallic element may be returned to its disposition in series with said heating coil.

References Cited in the file of this patent

UNITED STATES PATENTS

| | | |
|---|---|---|
| 2,069,946 | Durham | Feb. 9, 1937 |
| 2,374,315 | Whiteside | Apr. 24, 1945 |
| 2,398,682 | Whiteside | Apr. 16, 1946 |